United States Patent Office 3,779,997
Patented Dec. 18, 1973

3,779,997
POLY(HEXASUBSTITUTED MELAMINES)
Bruce A. Langager, New Brighton, Minn., assignor to Minnesota Mining and Manufacturing Company, St. Paul, Minn.
No Drawing. Filed June 12, 1972, Ser. No. 261,924
Int. Cl. C08g 33/02
U.S. Cl. 260—77.5 R                    14 Claims

ABSTRACT OF THE DISCLOSURE

Poly(hexasubstituted melamines) prepared by the Lewis acid catalyzed polymerization of alkylene bis-(N-substituted cyanamides) of the formula

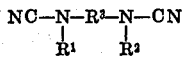

wherein $R^1$ and $R^2$ are broadly alkyl or aryl and $R^3$ is alkylene, such polymers being curable to a storable B-stage as well as fully cured condition, having excellent high temperature stability and being useful as structural adhesives or binders.

This invention relates to high temperature stable polymers, and more particularly to high temperature stable polymers prepared from alkylene bis - (N - substituted cyanamides). The polymers of this invention contain melamine (triamino-s-triazine) segments in which each of the amine hydrogens has been replaced by an organic group, and these segments are linked by alkylene groups.

BACKGROUND OF THE INVENTION

Polymers containing melamine segments have been prepared before. For example, in U.S. Pat. 2,824,088 there are described polymers containing triarylamino-s-triazine residues which are prepared by the reaction of trihalo-s-triazines with diamines, the reaction taking place with the liberation of hydrogen halide. The polymers retain a hydrogen atom on each of the amine groups present on each of the triazine segments, hence the polymer has a limited thermal stability.

Polymers containing melamine segments in which all of the hydrogens of each of the amine groups present on each of the triazine segments of the polymer have been replaced by an organic group are described in U.S. Pats. 3,382,221 and 3,277,065. These polymers, however, are prepared by the free radical catalyzed polymerization of hexasubstituted melamines wherein at least four of the substituents are allyl groups, and polymerization takes place via addition reaction at the allylic double bond. Moreover, polymers described in these patents must be prepared in an inert atmosphere because the presence of oxygen in more than trace amounts inhibits the polymerization.

Polymers containing melamine segments have also been prepared by polymerization of organic biscyanamides. For example, in U.S. Pat. 3,291,673 and British Pat. 1,009,892 it is disclosed that alkylenedicyanamides may be polymerized by keeping them, with or without a basic accelerator, in a liquid state at an appropriate temperature. The polymers obtained, however, although polymerized without the elimination of volatile by-products, contain hydrogen atoms attached to the nitrogen atoms. In addition, U.S. Pat. 3,303,101 describes the preparation of copolymers by heating a mixture of monocyanamides and dicyanamides. According to the disclosure of Smolin and Rapoport, "The Chemistry of Heterocyclic Compounds," Interscience, New York, 1959, at page 357, the polymers described in these patents most likely contain iso-melamine segments.

Other previously described polymers containing melamine, or perhaps iso-melamine, segments are described in German Pats. 1,958,320 and 1,965,907 and Netherlands Pat. 67/05,451, which describe polymeric products that are obtained by the reaction of organic poly (N-substituted cyanamides) and hydroxy or thiol compounds or mixtures thereof. These polymers, however, are believed to be significantly less stable than the polymers according to the present invention.

SUMMARY OF THE INVENTION

The present invention provides novel thermosetting poly(hexasubstituted melamines) that are readily prepared by the Lewis acid catalyzed polymerization of correspondingly substituted bis - (N - substituted cyanamides), a process that does not require condensation with elimination of volatile by-products, does not require an inert atmosphere, does not involve the use of electronegative group-activated compounds, nor the use of free radical-generating catalysts or copolymerization with compounds containing active hydrogen, hydroxyl or thiol groups. Moreover, such poly(hexasubstituted melamines) possess good high temperature stability.

It is, accordingly, an object of the present invention to provide poly(hexasubstituted melamines) having useful high temperature stability and excellent dielectric properties.

It is also an object of the present invention to provide a process for the production of poly(hexasubstituted melamines) that does not require condensation with elimination of undesirable volatile by-products.

It is also an object of the present invention to provide a process for the production of poly(hexasubstituted melamines) by Lewis acid catalyzed polymerization of divalent bis-(N-substituted cyanamides).

It is a further object of the present invention to provide a process for the production of poly(hexasubstituted melamines) that does not involve use of electro-negative group-activated compounds, free radical generating catalysts, or copolymerization with compounds containing active hydrogen or thiol groups.

These and other objects and advantages of the present invention will be readily apparent to one skilled in the art upon reading the more detailed description that follows.

As used throughout this specification and the claims, the terms "lower alkyl" and "lower alkoxy" embrace both straight and branched chain alkyl and alkoxy radicals, respectively, containing from 1 to 6 carbon atoms, for example, but without limitation thereto, methyl, ethyl, n-propyl, isopropyl, n-butyl, sec-butyl, tert-butyl, n-pentyl, sec-pentyl, n-hexyl, 2-ethylbutyl, 2,3-dimethylbutyl and the like in the case of "lower alkyl," and methoxy, ethoxy, n-propoxy, isopropoxy, n-butoxy, sec-butoxy, tert-butoxy, n-pentoxy, sec-pentoxy, n-hexyloxy, 2-ethylbutoxy, 2,3-dimethylbutoxy and the like in the case of "lower alkoxy"; the term "cyclo-lower alkyl" embraces lower alkyl-substituted and unsubstituted cycloalkyl radicals containing a total of from 3 to 9 carbon atoms, including, when substituted, the carbon atoms in the lower alkyl substituent or substituents, for example, but without limitation thereto, cyclopropyl, cyclobutyl, methylcyclopropyl, cyclopentyl, ethylcyclopropyl, dimethylcyclopropyl, 2-methylcyclobutyl, 3-ethylcyclopropyl, 2,3-dimethylcyclobutyl, 2-ethylcyclobutyl, 3-ethylcyclobutyl, cycloheptyl, 2,3-diethylcyclopropyl, 2-methyl-3-ethylcyclopropyl, 2,3,4-trimethylcyclobutyl, 2-ethyl-3-methylcyclohexyl, cycloheptyl, cyclononyl and the like; the term "aryl" embraces both substituted and unsubstituted monovalent organic radicals derived from aromatic hydrocarbons by the removal of one hydrogen atom, for example, but without limitation thereto, phenyl, naphthyl, anthryl, pyridyl, carbazyl, indolyl, 2-triazinyl, furyl, benzoxazolyl, benzthiazolyl and the like, such radicals, if desired, optionally bearing one or more lower alkyl, lower alkoxy, aryl, halogen, carbo-lower alkoxy, arylsulfonyl or nitro substituents; the term "aryloxy" embraces substituted or unsubstituted aryloxy radicals, for example, but without limitation thereto, phenoxy, 1-naphthyloxy, 2-naphthyloxy, 1-anthryloxy, 2-anthryloxy, 9-anthryloxy and the like, such radicals, if desired, optionally bearing one or more lower alkyl, lower alkoxy, aryl, halogen, carbo-lower alkoxy, arylsulfonyl or nitro substituents; the term "alkylene" embraces both straight and branched chain alkylene radicals of the formula $C_nH_{2n}$ wherein $n$ is an integer of from 1 to 20; and the term "halogen" includes chloro and fluoro.

The poly(hexasubstituted melamines) of the present invention consist essentially of segments (repeating units) having the structural formula

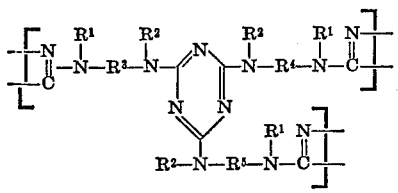

wherein $R^1$ and $R^2$ are the same or different and are lower alkyl (branched or straight chain), cyclo-lower alkyl, aryl and alkaryl radicals, said radicals further being optionally substituted by one or two chlorine or one to three fluorine atoms or by lower perfluoroalkyl, lower alkoxy or aralkoxy groups; and $R^3$, $R^4$ and $R^5$ are the same or different and are either straight or branched chain, containing from 1 to 20 carbon atoms, cycloalkylene radical having from 3 to 6 carbon atoms, or piperidyl or sym-triazinyl; and $R^1$, $R^2$ and $R^3$ taken together with the two nitrogen atoms to which they are attached form a divalent radical of the formula

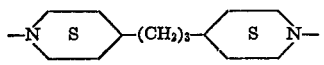

In the "B" stage, the materials are oligomeric and thermoplastic. They apparently contain a mixture of trimeric to hexameric chains of starting dicyanamides, which do not have more than about two triazine rings in any one polymer chain. Their average molecular weight in the B stage is from about 300 to 3,000. At this stage they retain useful solubility in chlorinated hydrocarbon such as methylene chloride, chloroform and the like.

In carrying out the process aspect of the present invention the poly(hexasubstituted melamine) final product is prepared by heating, in the presence of a Lewis acid catalyst, an alkylene bis-(N-substituted) cyanamide of the formula

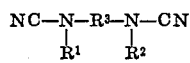

wherein $R^1$, $R^2$ and $R^3$ are as defined hereinabove, or a mixture of such bis-cyanamides in which $R^3$ is one or more different divalent radicals, i.e. is $R^4$ or $R^5$.

Among the alkylene bis-(N-substituted cyanamides) that may be used to prepare the poly(hexasubstituted melamines) according to the present invention are bis-(N-alkylcyanamides), such as, for example, ethylene bis-(N-methylcyanamide), propylene bis-(N - ethylcyanamide), hexamethylene bis-(N - butylcyanamide) and dodecylene bis-(N - butylcyanamide); alkylene bis-(N-cycloalkylcyanamides), such as, for example, propylene bis-(N-cyclohexycyanamide); alkylene bis-(N - arylcyanamides), such as, for example, propylene bis-(N-phenylcyanamide) and propylene bis-(N - benzylcyanamide); alkylene bis-cyanamides with mixed nitrogen substituents, such as, for example, ethylene bis-(N-methyl-N'-phenyl bis-cyanamide); and alkylene bis-[N-(substituted aryl) cyanamides], such as, for example, ethylene bis-[N-(4-chlorophenyl) cyanamide], butylene bis-[N-(methoxy phenyl) cyanamide] and butylene bis-[N-(4-phenoxyphenyl) cyanamide].

The alkylene bis-(N-substituted cyanamide) starting materials are prepared by known procedures described in the literature, including, for example, the dehydration of bis-ureas as described by Robinson, Can. J. Chem. 32, 32, 901 (1954); the dehydration of thioureas as described by Kurzer, J. Chem. Soc., 1950, 3269 and the preparation of 1,4-dicyanopiperazine as described by Kramer, Chem. Zentral, 1910 I, 1532 and Franchimont and Kramer, Rec. trav. chem. 31, 64 (1912).

The poly(hexasubstituted melamines) of the present invention are prepared by heating one or more alkylene bis-(N-substituted cyanamides) with a Lewis acid catalyst. The temperature and time of heating are varied according to the amount of and nature of the Lewis acid catalyst chosen to effect the polymerization. Generally, temperatures range from about 150° to 350° C. and polymerization times from about one hour to about 48 hours, and from about 0.5 to about 15 weight percent of Lewis acid catalyst is used. The higher the temperature and the greater the amount of catalyst used, the less is the time required to reach the B-stage and the thermoset stage of the polymer. The preferred conditions for preparing the poly(hexasubstituted melamines) are to heat the alkylene bis-(N-substituted cyanamides) at a temperature from 200° to 250° C. for from about two to 24 hours in the presence of 1 to 5 weight percent of a Lewis acid catalyst.

The polymerization reaction is readily controlled. For any given amount of catalyst, the polymerization proceeds with controlled application of heat to the B-stage, where the polymers formed are soluble and thermoplastic, or is carried on to the thermoset stage, where the polymers are crosslinked and therefore insoluble. By discontinuing heating at the B-stage, regardless of whether a high or low percentage of catalyst is employed in the polymerization, the polymerization can be halted. At this stage the polymer may be stored at lower temperature for an essentially unlimited period of time and, when desired, converted to the thermoset stage simply by the application of heat.

Lewis acid that may be used as catalyst for the polymerization of the alkylene bis-(N-substituted cyanamides) is defined as a substance that is electron deficient and tends to form a coordinated bond by accepting a pair of electrons. Suitable Lewis acids are selected from the "hard" and "intermediate" Lewis acids as classified by Pearson, J. Am. Chem. Soc. 85, 3633 (1963) and include but are not limited to aluminum chloride, aluminum bromide, aluminum iodide, stannic chloride, antimony trichloride, indium trichloride, cobaltic chloride, cobaltic bromide, indium oxide, cobaltic oxide, ferric oxide, ferric chloride, manganic acetate, manganic acetylacetonate, manganous acetylacetonate, titanium tetrachloride, titanium dioxide, boron trifluoride, boron trifluoride etherate, boron trichloride, ferrous chloride, cobaltus chloride, nickel chloride, manganese, dioxide, zinc chloride, lead chloride, lead iodide and the like. Some of these materials are of low activity and are essentially fillers. When used they may require the addition of more active catalyst to achieve complete cure within a practical length of time.

The preferred Lewis acid catalysts are those that have a low volatility, such as, for example, Lewis acids that do not volatilize or decompose below about 200° C., and particularly indium trichloride or zinc chloride and the like.

The polymerization of the alkylene organic bis-(N-substituted cyanamides) according to the present invention may be carried out in the presence of volatile Lewis acid catalysts; however, with such catalysts it is necessary that pressure equipment be utilized during the polymerization to confine the catalyst. The preferred catalysts are indium trichloride, stannic chloride, antimony trichloride, cobaltic chloride, zinc chloride, ferric chloride and the corresponding bromides.

By performing the polymerization of the alkylene bis-(N-substituted cyanamides) at lower polymerization temperatures and for shorter polymerizing periods, as described above, B-stage or thermoplastic hexasubstituted polymelamines are obtained. These B-stage polymelamines can also be stored for prolonged periods of time, without curing, yet remain usable at any subsequent time and are readily cured by the application of heat.

The claimed poly(hexasubstituted melamines) are particularly well suited for use in corrosive atmospheres and in environments subject to high temperatures because of their solvent resistance and high thermal stability and the fact that no volatile material is given off during polymerization. They may be modified with a variety of fibrous and finely divided inert filler materials such as clay, quartz flour, asbestos, glass filaments and woven and unwoven fabrics, ceramic particles and fibers, metal particles and fibers and carbon powders and fibers.

Laminates and composites, for example, are readily made by impregnating the filler material with a mixture of alkylene bis-(N-substituted cyanamides) or a mixture of alkylene bis-(N-substituted cyanamides) and an effective amount of the selected Lewis acid catalyst and simply heating the mixture to cause polymerization. If it is desired to produce storable and subsequently processible (i.e. moldable) laminates or molded composites, the heating may be carried out only to the formation of B-stage polymer. At a later time such "green" laminates or composites can be shaped to desired form and cured in that condition.

Laminates and composites with filler materials may also be made using B-stage oligomers that have been prepared from one or more alkylene bis-(N-substituted cyanamides). In this instance the B-stage polymer may be dissolved in a suitable solvent, the filler impregnated with the solution, the solvent removed, and the impregnated filler molded and cured to the thermoset stage, or the B-stage polymer may be melted, the filler impregnated with molten polymer, and the filled material molded and cured to the thermoset stage.

The following examples are illustrative of the invention but are not intended in any way to limit the scope thereof.

EXAMPLE 1

A mixture of 100 parts of hexamethylene bis-N-methylcyanamide and two parts of indium trichloride is sealed in a Carius tube and heated at 200° C. for 20 hours. The tube is cooled, then opened to yield a brittle, glassy, amber B-stage polymer having a glass transition temperature ($T_g$) of 65° to 87° C.

The B-stage polymer is cured to a tough, thermoset polymer by heating at about 200° C. for 14 hours.

EXAMPLE 2

The procedure described in Example 1 is carried out using tetramethylene bis-N-ethylcyanamide. A poly(hexasubstituted melamine) similar to that obtained in Example 1 is obtained.

EXAMPLE 3

A mixture of two parts of trimethylene bis-N-ethylcyanamide and 0.1 part of indium trichloride was heated in a test tube at 200° C. for 24 hours. A poly(hexasubstituted melamine) similar to that obtained in Example 1 was obtained on cooling.

EXAMPLE 4

The procedure described in Example 2 is carried out using 1,3-bis-[4-(N-cyanopiperidyl)] propane, which has the structure

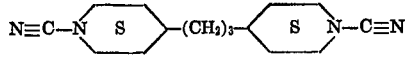

and which is prepared by cyanation of commercially available 1,3-di-(4-piperidyl) propane by known methods. A poly(hexasubstituted melamine) B-stage polymer similar to that obtained in Example 1 is obtained on cooling. When heated for 24 hours at 200° C. this material cures to a hard, tough solid which is insoluble in all common solvents.

EXAMPLE 5

A mixture of 30 parts 1,3-bis-[4-cyanopiperidyl)] propane and 1.2 parts of indium trichloride is heated at 160° C. with stirring for six hours to form a B-stage poly(hexasubstituted melamine). On cooling, a low-melting, wax-like solid is obtained, which has average molecular weight of about 510.

EXAMPLE 6

Thirty parts of the B-stage hexasubstituted melamine polymer prepared in Example 5 is diluted with about 15 parts of chloroform and used to saturate a glass cloth. The cloth is air dried, cut into portions and a 10-ply laminate assembled in a mold. The mold is placed in a press and heated at 225° C. for one hour with contact pressure and then for 1½ hours at 1000 p.s.i. After removing from the press and cooling, a laminate containing approximately 65 percent glass and 35 percent poly(hexasubstituted melamine) is obtained. The laminate is strong, tough and moisture- and solvent-resistant.

Similar results are obtained when polymers in B-stage form, as prepared by the procedures of Examples 1 to 4, are used in the process of this example.

What is claimed is:

1. Poly(hexasubstituted melamines) consisting of segments having the formula

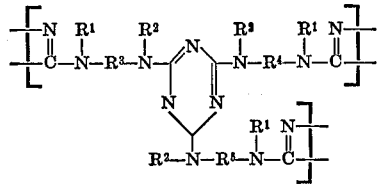

wherein $R^1$ and $R^2$ are each lower alkyl, cyclo-lower alkyl, aryl, and alkaryl, each being optionally substituted by one or two chlorine or one to three fluorine atoms or by lower perfluoroalkyl, lower alkoxy or aralkoxy group; $R^3$, $R^4$ and $R^5$ are the same or different and are divalent alkylene having from 1 to 20 carbon atoms, cycloalkylene having from 3 to 6 carbon atoms, piperidyl and $R^1$, $R^2$ and $R^3$ taken together with the two triazine nitrogen atoms to which they are attached form a divalent 1,3-bis[4-(1-piperidyl)] trimethylene radical.

2. Polymer according to claim 1 in thermoset, insoluble, cured form.

3. "B"-stage polymer according to claim 1, in thermoplastic, chlorinated hydrocarbon-soluble form, being capable of further curing to thermoset condition upon further heating thereof.

4. Polymer according to claim 1, wherein $R^3$ is hexamethylene, tetramethylene or trimethylene.

5. Polymer according to claim 4, wherein $R^2$ is methyl or ethyl.

6. Polymer according to claim 1, wherein $R^1$, $R^2$ and $R^3$, taken with the two nitrogen atoms to which they are attached, form a divalent 1,3-bis-[4-(1-piperidyl)] trimethylene radical.

7. "B"-stage polymer according to claim 3, in which $R^2$ is methyl or ethyl and $R^3$ is hexamethylene, tetramethylene or trimethylene.

8. Polymer according to claim 1, consisting essentially of repeating units having the formula

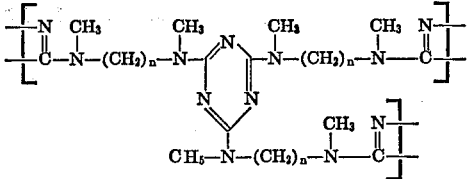

wherein $n$ is an integer from 2 to 6.

9. Polymer according to claim 8, wherein $n$ is 3.
10. Polymer according to claim 8, wherein $n$ is 6.
11. Polymer according to claim 1, consisting essentially of repeating units having the formula

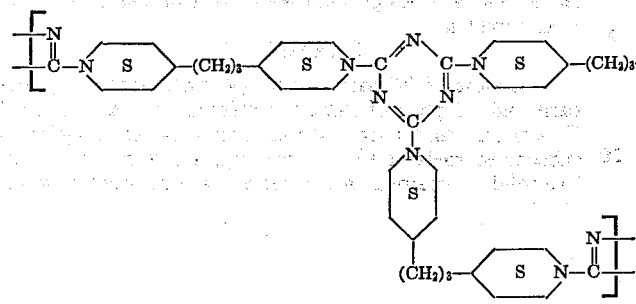

12. Process for making polymers according to claim 1, which comprises heating, in the presence of a Lewis acid catalyst, a compound of the formula

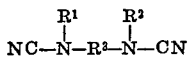

wherein $R^1$ and $R^2$ are each lower alkyl, cyclo-lower alkyl, aryl and alkaryl, each being optionally substituted by one or two chlorine or one to three fluorine atoms or by a lower perfluoroalkyl, lower alkoxy or aralkoxy group; $R^3$ is divalent alkylene having from 1 to 20 carbon atoms, cycloalkylene having from 3 to 6 carbon atoms, piperidyl; and $R^1$, $R^2$ and $R^3$ taken together with the two nitrogen atoms to which they are attached form a divalent 1,3-bis-[4-(1-piperidyl)] trimethylene radical.

13. A poly(hexasubstituted melamine) consisting essentially of repeating units having the formula:

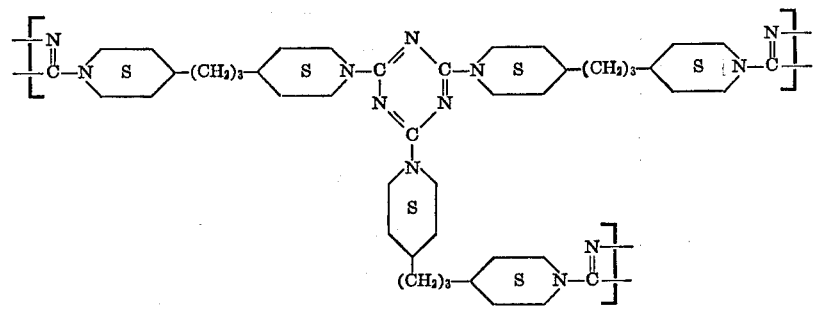

14. Poly(hexasubstituted melamine) consisting of segments having the formula wherein $R^1$ and $R^2$ are each lower alkyl, cyclo-lower alkyl, aryl and alkaryl, each being optionally substituted by one or two chlorine or 1 to 3 fluorine atoms or by lower perfluoroalkyl, lower alkoxy or aralkoxy group.

References Cited
UNITED STATES PATENTS

| 3,130,224 | 4/1964 | Sugino | 260—55 R |
| 3,155,628 | 11/1964 | Bloomfield | 260—2 R |
| 3,170,895 | 2/1965 | Reimschuessel et al. | 260—2 R |

FOREIGN PATENTS

| 253,352 | 1967 | U.S.S.R. | 260—2 R |
| 1,009,892 | 1965 | Great Britain | 260—2 R |
| 1,164,523 | 9/1969 | Great Britain | 260—2 R |
| 1,309,517 | 1962 | France | 260—2 R |
| 1,523,551 | 5/1968 | France | 260—2 R |

DONALD E. CZAJA, Primary Examiner

H. S. COCKERAM, Assistant Examiner

U.S. Cl. X.R.

161—190; 260—2 R, 37 N